United States Patent
Falk et al.

(10) Patent No.: US 11,393,106 B2
(45) Date of Patent: Jul. 19, 2022

(54) METHOD AND DEVICE FOR COUNTING A NUMBER OF MOVING OBJECTS THAT CROSS AT LEAST ONE PREDEFINED CURVE IN A SCENE

(71) Applicant: Axis AB, Lund (SE)

(72) Inventors: Daniel Falk, Lund (SE); Filip Jardby, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/333,368

(22) Filed: May 28, 2021

(65) Prior Publication Data

US 2022/0020159 A1  Jan. 20, 2022

(51) Int. Cl.
*G06K 9/00* (2022.01)
*G06T 7/246* (2017.01)
*G06T 7/70* (2017.01)

(52) U.S. Cl.
CPC ........... *G06T 7/248* (2017.01); *G06T 7/70* (2017.01); *G06T 2207/20076* (2013.01); *G06T 2207/30242* (2013.01)

(58) Field of Classification Search
CPC .......................................... G06T 2207/20076
See application file for complete search history.

(56) References Cited

U.S. PATENT DOCUMENTS

| | | | |
|---|---|---|---|
| 6,542,621 B1 | 4/2003 | Brill et al. | |
| 8,098,888 B1 | 1/2012 | Mummareddy et al. | |
| 2009/0296989 A1 | 12/2009 | Ramesh et al. | |
| 2010/0299116 A1 | 11/2010 | Tomastik et al. | |
| 2012/0046044 A1 | 2/2012 | Jamtgaard et al. | |
| 2012/0148102 A1* | 6/2012 | Moriguchi | G06T 7/277 382/103 |
| 2013/0163815 A1* | 6/2013 | Mai | G06T 7/20 382/103 |

(Continued)

OTHER PUBLICATIONS

Extended European Search Report dated Dec. 23, 2020 for European Patent Application No. 20184454.5.

(Continued)

*Primary Examiner* — Hadi Akhavannik
(74) *Attorney, Agent, or Firm* — Volpe Koenig

(57) ABSTRACT

A method for counting a number of moving objects that cross at least one predefined curve in a scene comprises making detections of positions of one or more moving objects in the scene, tracking the positions of the moving objects over time based on the detections to produce one or more corresponding tracks, wherein each track is described by a time dependent probability density function, calculating, for each moving object, a success probability $p^i$ that the moving object succeeded to cross the at least one predefined curve in the scene, wherein the success probability is calculated by using the time dependent probability density function describing the track of the moving object, and calculating an expected value and a variance of a number of moving objects that crossed the at least one predefined curve by summing success probabilities $p^i$ and summing products $p^i(1-p^i)$ of success and corresponding failure probabilities, respectively.

15 Claims, 5 Drawing Sheets

(56) References Cited

U.S. PATENT DOCUMENTS

2014/0294280 A1* 10/2014 Behrend ............... G06T 7/0014
　　　　　　　　　　　　　　　　　　　382/133
2014/0355829 A1　12/2014 Heu et al.
2015/0279182 A1　10/2015 Kanaujia et al.
2018/0025500 A1* 1/2018 Nielsen ................. G01S 5/0278
　　　　　　　　　　　　　　　　　　　382/103
2018/0046877 A1* 2/2018 Chen ...................... G06V 10/50
2019/0012607 A1　1/2019 Holliday et al.
2021/0396869 A1* 12/2021 Senzaki .................... G06T 7/11

OTHER PUBLICATIONS

Wahl et al., "A Distributed PIR-based Approach for Estimating People Count in Office Environments," 2012 IEEE 15th International Conference on Computational Science and Engineering, pp. 640-647 (2012).

* cited by examiner

METHOD AND DEVICE FOR COUNTING A NUMBER OF MOVING OBJECTS THAT CROSS AT LEAST ONE PREDEFINED CURVE IN A SCENE

FIELD OF INVENTION

The present invention relates to the field of counting moving objects in a scene. In particular, it relates to a method and device for counting a number of moving objects that cross at least one predefined curve in a scene.

TECHNICAL BACKGROUND

An object counter is a tool that counts how many objects passes by a sensor device. For example, in case of the sensor device being a video camera, the object counter may count how many objects pass a certain counting zone in the view of the video camera. Possible areas of application of object counters include keeping track of how many people that enter or exit an area and determining how many people currently occupy the area.

One approach of implementing an object counter is to make detections of an object in a scene by using a sensor device, and then tracking the movements of the object throughout the scene based on the detections. If the track crosses the counting zone, it is considered to be a passage and the counter increases its value. Typically, the counting zone is defined by one or more lines, such that the counter is increased if the track crosses the one or more lines. The value of the counter is then visualized to a user who can take appropriate action depending on the value of the counter. The value of the counter may further be used to trigger various events, such as triggering an event if too many objects passed the counting zone.

The detections of an object in the scene made by using a sensor device, is associated with a spatial uncertainty. The position of the object in the scene is hence not exactly measured by the sensor device, but rather with a measurement error. This spatial uncertainty in turn propagates to give rise to a spatial uncertainty of the track which is estimated from the detections. As a consequence, one cannot be sure whether a track really crossed the counting zone or not.

A drawback with known object counters is that they do not take the uncertainty of whether or not a track crossed the counting zone into account. Instead, despite this uncertainty, they either trigger a count or they do not and then present a passage count value to a user in the form of a single estimated number. No information regarding the uncertainty of the passage count value is provided. As a result, the user cannot know the confidence of the passage count value or any event triggered therefrom. There is thus room for improvements.

SUMMARY

In view of the above, mitigating the above problems and providing an object counting method and device which does not only provide a count of the number of objects, but also a measure of uncertainty of the count of the number of objects would be beneficial.

According to a first aspect there is provided a method for counting a number of moving objects that cross at least one predefined curve in a scene, comprising:

making detections of positions of one or more moving objects in the scene by using data collected by a sensor device, tracking the one or more moving objects in the scene over time based on the detections to produce one or more corresponding tracks, wherein each track is described by a time dependent probability density function, calculating, for each moving object, a success probability $p^i$ that the moving object succeeded to cross the at least one predefined curve in the scene, and a failure probability $1-p^i$ that the moving object failed to cross the at least one predefined curve in the scene, wherein the success probability is calculated by using the time dependent probability density function describing the track of the moving object, and calculating an expected value and a variance of a number of moving objects that crossed the at least one predefined curve, wherein the expected value is calculated by summing success probabilities $p^i$ calculated with respect to the one or more moving objects, and the variance is calculated by summing products $p^i(1-p^i)$ of success and failure probabilities calculated with respect to the one or more moving objects.

This method takes a probabilistic approach to counting moving objects that passes at least one predefined curve in the scene. In prior art methods, a track of an object either triggers a count or it does not without taking any concern to the uncertainty of whether or not a track crossed the counting zone. In contrast, the proposed method suggests calculating a success probability reflecting how probable it is that that a moving object crossed the at least one predefined one curve in the scene. In that way one gets a measure of how sure one be that a track of an object successfully crossed the at least one curve.

The inventors have realized that such a success probability can be calculated once a track of a moving object is available in the form of a time dependent probability density function describing the uncertain track of the moving object as a function of time. For example, a known filtering algorithm that statistically filters the detected positions, such as a Kalman filter or a particle filter algorithm, may be used to produce the tracks.

When a success probability has been calculated for each object, the inventors have further realized that it is possible to calculate an expected value of the number of objects that crossed the at least one curve by summing the success probabilities. Additionally, a variance of the number of objects that crossed the at least one curve may be calculated by summing products of success probabilities and corresponding failure probabilities calculated with respect to the moving objects. Accordingly, the method provides both a count of the number of objects (the expected value) and an uncertainty measure (the variance) of the count of the number of objects.

A moving object may be any type of moving object. For example, it may be a person, a car, an animal, etc.

By a position in the scene is meant a spatial position described in one, two or three dimensions.

By a predefined curve in the scene is typically meant a virtual curve which is defined in the scene. In case the positions are described in one dimension, the curve corresponds to a point. In case the positions are described in two dimensions, the curve may be a curve in a two-dimensional plane. For example, the curve may be a line. If the positions in the scene instead are described in three dimensions, the curve may instead correspond to a two-dimensional surface.

The predefined curve may be defined in terms of mathematical expression which describes the extent of the curve of the scene.

By a detection of a position is meant a measurement of the position. The detection is typically associated with a measurement error.

By a track of a moving object is generally meant information describing the movement of the moving object as a function of time. For example, a state vector may be used to describe motion related parameters of the moving object at each of a plurality of time points. The state vector may include states relating to one or more of the positions, velocity, and acceleration of the moving object. If the state vector of the moving object at time $t_j$ is denoted by $X_j$, the collection of state vectors $\{X_1, X_2, X_3, \ldots, X_J\}$ may be said to define the track. Since the track of the moving object is associated with an uncertainty, the state vector at each time point may be modelled by a random variable.

By a time dependent probability density function is meant a probability density function that varies over time.

By a track being described by a time dependent probability density function is meant that the information describing the movement of the moving object is described by a time dependent probability density function. This implies that the information describing the movement of the moving object is at each point in time described by a probability density function. For example, the time dependent probability density function may be the probability density functions $\{f_{X_1}(x), f_{X_2}(x), f_{X_3}(x), \ldots, f_{X_J}(x)\}$ of the state vectors $\{X_1, X_2, X_3, \ldots, X_J\}$ defining the track.

In some example embodiments, the counting method counts passages of a single predefined curve in the scene. However, it has been found that such an approach may be sensitive to noise in the sensor device data. Therefore, the counting method may instead count passages of more than one predefined curve in the scene, i.e., the object should cross all the predefined curves in order to be considered a passage. The use of several predefined curves also simplifies checking from what direction the moving object passes the curves. Accordingly, the at least one predefined curve may include a first and a second predefined curve. Further, the calculation of the success probability may include calculating a first and a second success probability that the moving object succeeded to cross the first and the second predefined curve in the scene, respectively, and calculating a product of the first and the second success probability. Accordingly, the product of the first and the second success probability is indicative of the probability that the moving object successfully crossed both the first and the second curve.

The time dependent probability density function describing a track of a moving object may define a likelihood for each possible trajectory of the moving object. Further, calculating a success probability that a moving object succeeded to cross a predefined curve in the scene may include integrating the likelihood over all trajectories that cross the predefined curve. Accordingly, the success probability may be evaluated by solving an integral.

By a trajectory is meant a sample of a track. A trajectory may be a sample of a portion of the track, such as a portion of a track extending between two time points when detections of the position are made.

The success probability of a moving object may be calculated by algebraically solving the above-mentioned integral. Alternatively, a numerical integration approach may be adopted to solve the integral. In more detail, integrating the likelihood may include: simulating a plurality of sample trajectories of the moving object, calculating a weight for each sample trajectory checking for each sample trajectory whether it crosses the predefined curve in the scene, and summing the weights for those sample trajectories that cross the predefined curve and dividing by a number of sample trajectories. The sample trajectories may be simulated from a sampling distribution according to which a likelihood of each sample trajectory may be calculated. Further, the weight of a sample trajectory may be calculated as a ratio between the likelihood of the sample trajectory according to the time dependent probability density function and the likelihood of the sample trajectory according to the sampling distribution.

When detecting objects in the scene using the sensor device, there is always a risk that the sensor device fails to detect a moving object. The reason for the failure may be due to different causes, such as two objects moving too close to each other or there being too much noise in the data. As a result, the tracking will not be able to produce a track for the moving object. The chance that a track of a moving object is successfully detected may be described in terms of a probability that the track of a moving object is successfully detected. Such a probability may be pre-estimated and used as an input to the counting method in order to weight the success probability. More specifically, the method may further comprise dividing the success probability by a predetermined weighting factor, wherein the predetermined weighting factor corresponds to a probability that a track of a moving object is successfully detected. In that way, the method may take the risk of failing to detect a track of a moving object into account.

The chances of successfully detecting a track of an object in the scene may depend on conditions in the scene. For example, the probability of successfully detecting a track of an object may be higher in a lighter scene than in a darker scene. Therefore, the predetermined weighting factor may be selected depending on conditions in the scene. The conditions may include a light condition in the scene, a level of motion in the scene, a number of moving objects currently being tracked in the scene, the distribution of passages along the at least one curve within the scene (uniformly distributed, normally distributed) etc. It is further understood that the conditions in the scene may change over time, and different weighting factors may hence be selected at different points in time.

Whether or not a moving object crosses the at least one line may be seen as a random experiment with two possible outcomes, "success" or "failure", where the calculated success probability $p^i$ describes the probability of a successful outcome. Such a random experiment is in probability theory known as a Bernoulli trial, and may be described by a Bernoulli-distributed random variable which takes the value 1 with the success probability $p^i$, and the value 0 with the associated failure probability $(1-p^i)$. Accordingly, whether or not a moving object with index i crossed the at least one line may be described by a Bernoulli-distributed random variable having a success probability given by $p^i$. This means that the moving object with index i will be counted as having crossed the at least one predefined curve with the success probability $p^i$.

From probability theory, it further follows that the sum of a plurality of independent Bernoulli-distributed random variables having different success probabilities will follow a Poisson binomial distribution. Notably, the expected value of a Poisson binomial distribution is obtained by summing the success probabilities of the Bernoulli variables and the variance by summing the products of the success and failure probabilities of the Bernoulli variables. Therefore, if the count of each moving object is modelled by a Bernoulli-distributed random variable, the count of the number of moving objects that crossed the at least one curve will follow a Poisson binomial distribution. Accordingly, the number of moving objects that crossed the at least one predefined curve may be described by a Poisson binomial distribution having the calculated expected value and variance.

As previously described, the detections made by using the sensor device are associated with a measurement error which gives rise to a spatial uncertainty in the detected positions. The measurement error can never be completely be removed. However, it can be smaller or larger depending on where in the scene the sensor device is installed. The spatial uncertainty of the detections in turn leads to an uncertainty in the number of objects being counted as having crossed the at least one curve. Thus, a higher spatial uncertainty typically manifest itself as a higher variance of the object count. Another factor that contributes to the variance of the object count is where the moving objects typically move in relation to the at least one curve. For example, if the moving objects move closer to the end points of the at least one curve, the object count will be more uncertain. In example embodiments, these facts are used to generate an alert concerning a possibly bad installation position of the sensor device in the scene. In more detail, the method may further comprise generating an alert if the variance of the number of moving objects that crossed the at least one predefined curve exceeds a predefined threshold. In some cases, an alert is only generated if the expected value of the number of moving objects that crossed the at least one predefined curve exceeds another predefined threshold. Alternatively, an alert could be generated if the variance or standard deviation of the number of moving objects that crossed the at least one predefined curve in relation to the expected value exceeds a threshold. The variance may continuously be monitored to generate the alert when the threshold is exceeded. Alternatively, the variance may be monitored during an installation period of the sensor device and an alert may be generated if the threshold is exceeded during the installation period.

The counting method may separately count moving objects that cross the at least one curve from different sides thereof. In this way one can, for instance, count objects moving into an area and out of an area separately. In more detail, the step of calculating an expected value and a variance may include calculating a first expected value and a first variance of a number of moving objects that crossed the at least one predefined curve in a first direction from a first to a second side of the at least one predefined curve, and a second expected value and a second variance of a number moving objects that crossed the at least one predefined curve in a second direction from the second to the first side of the at least one predefined curve.

The first expected value and the first variance may be calculated by summing success probabilities $p^i$ and products $p^i(1-p^i)$ of success and failure probabilities calculated with respect to moving objects that approach the at least one predefined curve in the first direction, and the second expected value and the second variance are calculated by summing success probabilities $p^i$ and products $p^i(1-p^i)$ of success and failure probabilities calculated with respect to moving objects that approach the at least one predefined curve in the second direction. Which moving objects that approach the at least one predefined curve from a certain side thereof may be deduced by studying the motion direction of the tracks in relation to the at least one curve. For example, if an object track indicates that a moving object most likely has a position at the first side at a first point in time and a position at the second side at a second, later, point in time the method may deduce that the object approaches the at least one curve from the first side.

In example embodiments, the counting method may be used to calculate a net flow of moving objects via an entrance into an area. In such cases, the at least one predefined curve may be located at the entrance of an area in the scene. Particularly, the at least one predefined curve in the scene may define boundaries of a counting zone arranged at an entrance of an area in the scene, and the first direction may correspond to a direction into the area and the second direction to a direction out from the area. Under those circumstances, the method may further comprise calculating an expected value and a variance of a net flow of moving objects into the area via the entrance as a difference between the first and second expected value and a sum of the first and the second variance, respectively.

The method may further be used to generate an alert if the net flow is too high. Specifically, the method may further comprise calculating a probability that the net flow of moving objects into the area via the entrance is larger than a threshold, and generating an alert if the calculated probability is larger than a predefined significance level. In this way, the alert is only generated if the net flow is too high with a high certainty. Thus, false alarms may be avoided.

The method may also extend to the situation where the area in the scene comprises a plurality of entrances, each being associated with a counting zone defined by at least one predefined curve. In that case, the method is repeated for each entrance to calculate an expected value and a variance of a net flow of moving objects into the area via each entrance.

The method may further generate an alert if the occupancy in the area with high certainty is larger than a threshold. In more detail, the method may further comprise calculating a probability that the net flow of moving objects into the area via any of the plurality of entrances is larger than a threshold, and generating an alert if the calculated probability is larger than a predefined significance level.

The method may be implemented for various types of sensor devices. For example, the sensor device may be a camera, a radar, a lidar, or a global navigation satellite system device. The camera may be a visual light camera or a thermal camera. The sensor device may also be a device that senses the position of the moving object by means of a wireless connection, such as a WiFi or a Bluetooth connection, for example by using triangulation techniques.

According to a second aspect, a device for counting a number of moving objects that cross at least one predefined curve in a scene, comprises:

a detector configured to make detections of positions of one or more moving objects in the scene using data collected by a sensor device, a tracker configured to track the one or more moving objects in the scene over time based on the detections made by the detector to produce one or more corresponding tracks, wherein each track is described by a time dependent probability density function, a calculating unit configured to, for each moving object, calculate a success probability $p^i$ that the moving object succeeded to cross the at least one predefined curve in the scene, and a failure probability $1-p^i$ that the moving object failed to cross the at least one predefined curve in the scene, wherein the success probability is calculated by using the time dependent probability density function describing the track of the moving object, and a calculating unit configured to calculate an expected value and a variance of a number of moving objects that crossed the at least one predefined curve, wherein the expected value is calculated by summing success probabilities $p^i$ calculated with respect to the one or more moving objects, and the variance is calculated by summing products $p^i(1-p^i)$ of success and failure probabilities calculated with respect to the one or more moving objects.

According to a third aspect, a non-transitory computer-readable medium comprises computer-code instructions adapted to carry out the method of the first aspect when executed by a device having processing capability.

The second and third aspects may generally have the same features and advantages as the first aspect. It is further noted that the concepts relate to all possible combinations of features unless explicitly stated otherwise.

BRIEF DESCRIPTION OF THE DRAWINGS

The above, as well as additional objects, features and advantages will be better understood through the following illustrative and non-limiting detailed description of embodiments, with reference to the appended drawings, where the same reference numerals will be used for similar elements, wherein.

DETAILED DESCRIPTION

The present concepts will now be described more fully hereinafter with reference to the accompanying drawings, in which embodiments are shown.

Figure 1:
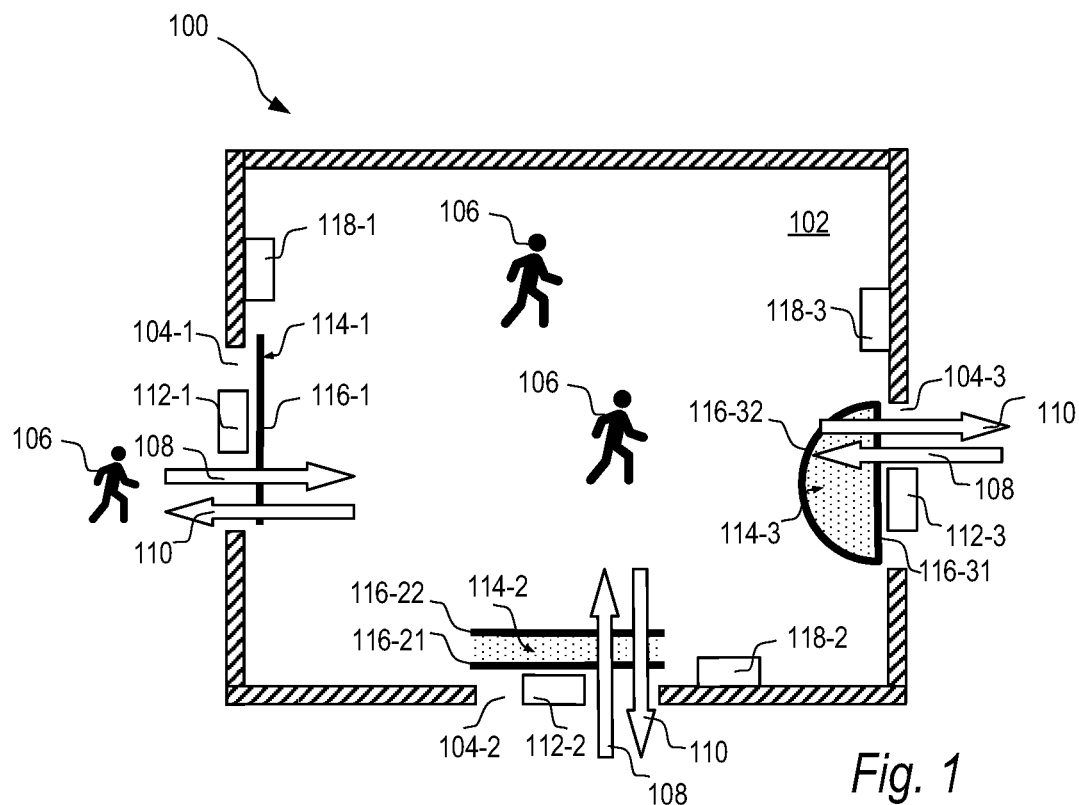
FIG. 1 schematically illustrates a scene in which one or more devices for counting a number of moving objects that cross at least one predefined curve in the scene may be installed.

FIG. 1 illustrates a scene 100. The scene 100 includes an area 102. As illustrated, the area 102 may be the inside of a building. The area 102 has one or more entrances 104-1, 104-2, 104-3. In this case three entrances are shown. Moving objects 106, which may be persons, may enter and leave the area 102 via any of the entrances 104-1, 104-2, 104-3. Particularly, the moving objects 106 may move into the area 102 in an in-bound direction 108 and out from the area 102 in an out-bound direction 110.

In order to detect positions of the moving objects 106 in the scene 100, one or more sensor devices 112-1, 112-2, 112-3 may be arranged in the area 102. For example, there may be one sensor device 112-1, 112-2, 112-3 per entrance 104-1, 104-2, 104-3. Here three sensor devices are shown. Each sensor device 112-1, 112-2, 112-3 may be arranged such that a corresponding entrance 104-1, 104-2, 104-3 is in its field of view. Particularly, the field of view of each sensor device 112-1, 112-2, 112-3 may cover a counting zone 114-1, 114-2, 114-3 defined at the corresponding entrance 104-1, 104-2, 104-3. However, it is understood that it is possible to have one sensor device with a field of view that covers several counting zones 114-1, 114-2, 114-3, or more than one sensor device with a field of view that covers a counting zone 114-1, 114-2.

The sensor devices 112-1, 112-2, 112-3 may generally be any type of sensor devices that are able to collect data from which the position of the moving objects 106 may be derived. In one example, the sensor devices 112-1, 112-2, 112-3 are video cameras. The video cameras may be arranged to monitor the scene 100 from above. For example, a ceiling-mounted video camera looking down at the counting zone 114-1, 114-2, 114-3 may be arranged at each entrance 104-1, 104-2, 104-3. The video camera may be a mono or a stereo video camera. In other examples, the sensor devices are radar devices or lidar devices. It is also possible that different sensor devices 112-1, 112-2, 112-3 are of different types. In still further examples, the sensor devices are not mounted in the area 102. Instead, the moving objects 106 carry sensor devices which are able detect the position of the objects 106. Such sensor devices include global navigation satellite system devices. For example, devices using the global positioning system (GPS) may be used.

As mentioned above, a counting zone 114-1, 114-2, 114-3 may be defined at each entrance 104-1, 104-2, 104-3. The purpose of the counting zones 114-1, 114-2, 114-3 is to facilitate the counting of persons that passes through the entrances 104-1, 104-2, 104-3. If a person passes a counting zone 104-1, 104-2, 104-3 it is counted as a passage through the corresponding entrance 104-1, 104-2, 104-3.

Each counting zone 114-1, 114-2, 114-3 may defined in terms of one or more curves 116-1, 116-21, 116-22, 116-31, 116-32. The curves may be defined with respect to a two-dimensional coordinate system. The one or more curves 116-1, 116-21, 116-22, 116-31, 116-32 delimits the corresponding counting zone, i.e., they form boundaries of the counting zones 114-1, 114-2, 114-3. In the illustrated example, the counting zone 114-1 is defined by one curve 116-1. The curve 116-1 is a line of limited length. The counting zone 114-2 is defined by the area formed between the two curves 116-21, 116-22. The two curves 116-21, 116-22 are two parallel lines of limited length. The counting zone 114-3 is defined by the area formed between the two curves 116-31, 116-32. The curve 116-31 is a line of limited length, while the second curve 116-32 is a curve of limited length and of curved shape. It is understood that the illustrated counting zones and associated curves are only some of many possible alternatives of how to design a counting zone.

The purpose of the curves 116-1, 116-21, 116-22, 116-31, 116-32 is to enable the counting of objects that passes the counting zones 114-1, 114-2, 114-3. Specifically, the problem of counting objects that pass each counting zone 114-1, 114-2, 114-3 may be formulated in terms of counting objects that cross the curves 116-1; 116-21, 116-22; 116-31, 116-32, respectively. For the counting zone 114-1, a passage corresponds to a track of a moving object 106 crossing the curve 116-1. For each of counting zones 114-2, 114-3, a passage corresponds to the track of a moving object 106 crossing both curves 116-21, 116-22 and 116-31, 116-32, respectively, making up the counting zone. Accordingly, the problem of counting passages of moving objects 106 through an entrance 104-1, 104-2, 104-3 may be formulated as counting the number of moving objects that cross at least one curve 116-1, 116-21, 116-22, 116-31, 116-32.

One or more devices 118-1, 118-2, 118-3 for counting a number of moving objects that cross at least one curve 116-1, 116-21, 116-22, 116-31, 116-32 may further be arranged in the scene 100. The one or more counting devices 118 are arranged to receive data collected by the sensor devices 112-1, 112-2, 112-3, e.g. via a wired or wireless connection. For example, such a counting device 118 may be integrated in each of the sensor devices 112-1, 112-2, 112-3. Alternatively, the one or more counting devices 118 may be provided as separate units. It is further possible that one counting device 118 operate on basis on input from several sensor devices 112-1, 112-2, 112-3 to count passages of several counting zones 114-1, 114-2, 114-3. The counting device 118 may also be arranged remotely from the scene 100 as long as it is operatively connected to the sensor devices 112-1, 112-2, 112-3 to receive the collected sensor data.

Figure 2:
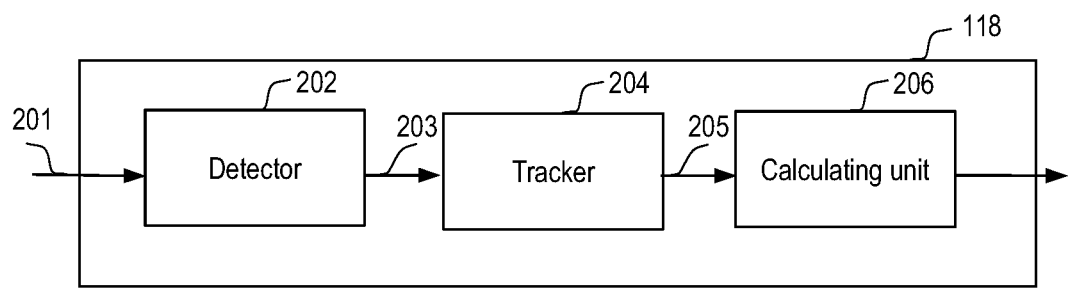
FIG. 2 schematically illustrates internal components of one of the devices of FIG. 1 according to embodiments.

FIG. 2 illustrates internal components of a counting device 118 in more detail. The counting device 118 includes a detector 202, a tracker 204, and a calculating unit 206.

The counting device 118 thus comprises various components 202, 204, 206 which are configured to implement the functionality of the device 118. In particular, each illustrated component corresponds to a functionality of device 118. Generally, the device 118 may comprise circuitry which is configured to implement the components 202, 204, 206, and more specifically their functionality. In a hardware implementation, each of the components 202, 204, 206, may correspond to circuitry which is dedicated and specifically designed to provide the functionality of the component. The circuitry may be in the form of one or more integrated circuits, such as one or more application specific integrated circuits or one or more field-programmable gate arrays. By way of example, the change detector 204 may thus comprise circuitry which, when in use, identifies pixels in the image that have changed since a previous image in the image sequence. In a software implementation, the circuitry may instead be in the form of a processor, such as a microprocessor, which in association with computer code instructions stored on a (non-transitory) computer-readable medium, such as a non-volatile memory, causes the device 118 to carry out any method disclosed herein. Examples of non-volatile memory include read-only memory, flash memory, ferroelectric RAM, magnetic computer storage devices, optical discs, and the like. In a software case, the components 202, 204, 206, may thus each correspond to a portion of computer code instructions stored on the computer-readable medium, that, when executed by the processor, causes the device 118 to carry out the functionality of the component. It is to be understood that it is also possible to have a combination of a hardware and a software implementation, meaning that the functionality of some of the components 202, 204, 206 are implemented in hardware and others in software.

Figure 3:
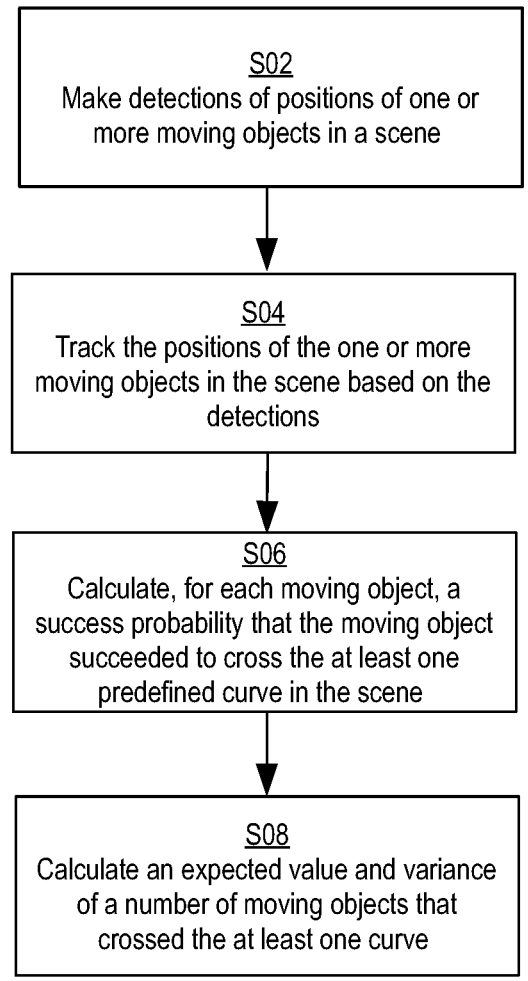
FIG. 3 is a flow chart of a method for counting a number of moving objects that cross at least one predefined curve in a scene according to embodiments.

The operation of the counting device 118 when carrying out a method for counting a number of moving objects that cross at least one predefined curve in a scene 100 will now be described with reference to FIG. 1, FIG. 2, and the flow chart of FIG. 3.

The counting device 118 operates on data 201 collected by one or more of the sensor devices 112-1, 112-2, 112-3. For example, such data 201 may include video data, radar data, lidar data, or GPS data. In step S02, the detector 202 makes detections of positions or one or more moving objects 106 in the scene 100 by using the data 201. The detector 202 may make detections sequentially in time as the data 201 reaches the detector 202. For example, if the data 201 is video data, the detector 202 may make detections in the video data frame by frame as the frames are produced by the sensor devices 112-1, 112-2, 112-3 and are input to the device 118. The counting device 118 thereby produces detections of positions for the one or more moving objects 106 for a plurality of subsequent time points. This is further illustrated in FIG. 4 which shows detections 401-t1 to 401-t7 of positions of one moving object at a plurality of subsequent time points t1 to t7. The detections of the positions may be described by coordinates in a two-dimensional coordinate system.

How to make detections of positions of moving objects 106 from video data, radar data, lidar data or GPS data is generally known in the art. The detector 202 may use any known detection algorithm which suits the sensor data 201 at hand. For example, if the sensor data 201 is video data, the detector 202 may perform foreground/background segmentation on the video data to detect positions of moving objects depicted therein. The detected position may for instance be the center of gravity of a segmented foreground object.

The tracker 204 operates on the detections made by the detector 202 as illustrated by the arrow 203 of FIG. 2. In particular, the tracker 204 in step S04 tracks the one or more moving objects in the scene over time based on the detections. In this way, the tracker 204 produces one or more tracks 205 corresponding to the one or more moving objects 106. Each track includes information being indicative of the movement of the moving object as a function of time. This may include information relating to a position, velocity, and acceleration of the moving object. For this purpose, the tracker 204 may implement a tracking algorithm. Specifically, it may implement a tracking algorithm which describes a track of an object in the form of a time dependent probability density function. Hence, the information describing the movement of the moving object is described by a time dependent probability density function. Particularly, the position, velocity and/or acceleration of the moving object may be described by a time dependent probability density function. Such tracking algorithms are well-known in the art and will therefore not be described in detail. Examples of tracking algorithms that can be used are filtering algorithms, such as the Kalman filter algorithm or the particle filter algorithm.

The above exemplified tracking algorithms rely on a state space model describing the movement of the object. In this case, a state vector may be defined for each tracked object. The state vector may include two states corresponding to the two coordinates of the position of the object, two states corresponding to the velocity of the object along each coordinate direction, and two states corresponding to the acceleration of the object along each coordinate direction. It is also possible to have a state vector with two states corresponding to the two coordinates of the position of the object and two states corresponding to the velocity of the object. In the latter case the acceleration of the object may be assumed to be constant, for example equal to zero. It is further possible to have a state vector which includes even higher derivatives of the position.

As is known in the art, a state space model specifies a first set of equations describing a transition of the state vector of the object from one point in time to a next point in time being $\Delta t$ later than the first point in time. The first set of equations may in this case be set up following basic physical relationships between position, velocity and acceleration. The tracker 204 may use the first set of equations to predict the state vector of the object from a current time point to the next time point. For example, if the state vector at time $t_j$ is denoted by $X_j$ the state vector $X_{j+1}$ at time $t_{j+1}=t_j+\Delta t$ may be predicted using the first set of equations. The first set of equations further defines a random prediction error, which preferably is set to follow a multivariate Normal distribution.

The state space model further specifies a second set of equations describing how the detections are related to the state vector of the object. In this case, the detections are detections of the two coordinates of the position of the object with a random detection error. The random detection errors in the x- and the y-coordinate may be assumed to be independent and may each be set to follow a Normal distribution. The tracking algorithm uses the second set of equations to filter the state vector that was predicted using the first set of equations once a detection has been made. Filter in this context means calculating a conditional distribution of the predicted state vector given the detection.

Due to the random prediction error and the random detection error, there is an uncertainty in the states of an object at each point in time. The tracker 204 calculates this uncertainty. In more detail, the tracker 204 may calculate, for each point in time, a probability density function of the state vector of the object. As known in the art, this is performed by recursively using the first and second set of equations described above to interchangeably predict the probability density function of the state vector of the object and filter the predicted probability density function of the state vector of the object in view of the detections.

Accordingly, the tracker 204 in step S04 takes the detections 203 from the detector 202 as input and calculates for each of the one or more moving objects 106 a time dependent probability density function 205 of the state vector of the object. The output 205 from the tracker 204 may hence be a track in the form of a collection of probability density functions $\{f_{X_1}(x), f_{X_2}(x), f_{X_3}(x), \ldots, f_{X_J}(x)\}$ of the state vectors $\{X_1, X_2, X_3, \ldots, X_J\}$ at times $t_1, t_2, t_3, \ldots, t_J$. When a Kalman filter is used, the time dependent probability density function of the state vector of the object is a multivariate Normal distribution with time varying mean value and covariance matrix. The time dependent probability density function describing the track of a moving object is further illustrated in FIG. 4. In more detail, the probability density function 402-t1 to 402-t7 of the positional states of the state vector of the object is shown for each time point t1-t7 in the form of an ellipse which is intended to illustrate the uncertainty of the position as given by the probability density function.

Figure 4:
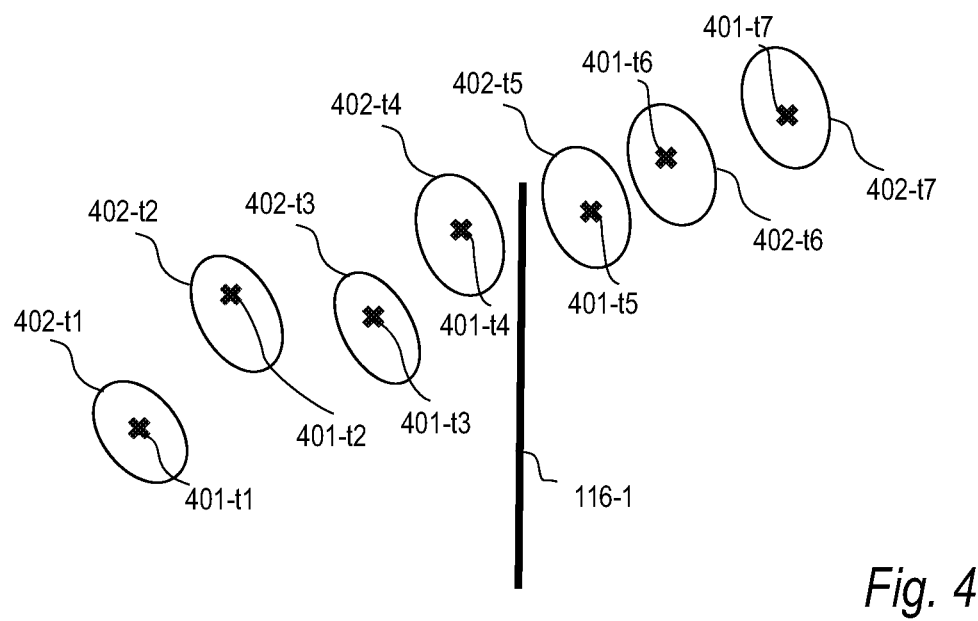
FIG. 4 schematically illustrates detected positions and calculated probability density functions for the position of a moving object for a plurality of time points.

In step S06, the calculating unit 206 proceeds to calculate, for each moving object 106, a success probability that the moving object 106 succeeded to cross the at least one predefined curve 116-1, 116-21, 116-22, 116-31, 116-32 in the scene 100. In the following, the success probability calculated with respect to object i is denoted $p^i$. In the example of FIG. 4, the at least one curve corresponds to the curve 116-1 arranged at the entrance 104-1 of FIG. 1. The calculating unit 206 may further calculate a corresponding failure probability for each moving object 106 as $1-p^i$.

The calculating unit 206 may calculate the success probability of a moving object 106 by using the time dependent probability density function 205 of the state vector of the moving object 106, i.e., the probability density functions $\{f_{X_1}(x), f_{X_2}(x), f_{X_3}(x), \ldots, f_{X_J}(x)\}$ of the state vectors $\{X_1, X_2, X_3, \ldots, X_J\}$ defining the track.

There are many different trajectories that the moving object 106 may follow. Each trajectory may be seen as a sample of the track. In particular, each trajectory may be seen as a sample $\{x_1, x_2, x_3, \ldots, x_J\}$ of the state vectors $\{X_1, X_2, X_3, \ldots, X_J\}$ defining the track. Herein large letters are used to indicate a random variable, while small letters are used to indicate a sample of a random variable. Some trajectories are more likely than others. The likelihood of each trajectory $\{x_1, x_2, x_3, \ldots, x_J\}$ is defined by the time dependent probability density function 205.

The calculating unit 206 may calculate the success probability $p_i$ that a moving object 106 succeeded to cross a predefined curve by calculating an integral of the likelihood defined by the time dependent probability density function 205 describing the track of the moving object 106. In particular, the calculating unit 206 may integrate the likelihood over a set that corresponds to all trajectories that cross the predefined curve.

Specifically, the calculating unit 206 may, for each time point $t_j$, $j=1, \ldots, J-1$ evaluate an integral corresponding to the probability $p_{t_j}^{i,C_1}$ that the moving object i crossed the predefined curve $C_1$ between time $t_j$ and $t_{j+1}$. The plurality of time points t; may correspond to the time points when detections were made. In the case of the sensor device 112-1, 112-2, 112-3 being a video camera, the time points $t_j$ may correspond to subsequent video frames captured by the video camera.

When such an integral has been evaluated for each time point, the success probability $p^{i,C_1}$ that the moving object i crossed the curve $C_1$ at least one time may be evaluated as:

$$p^{i,C_1} = \min\left(\sum_{j=1}^{J-1} p_{t_j}^{i,C_1}, 1\right).$$

If a counting zone 114-1, 114-2, 114-3 is defined by more than one curve, say M curves, the above may be repeated for each curve of the counting zone. Under an assumption of independence of the success probabilities for the different curves, a success probability $p^i$ that the moving object i crossed each of the curves may be calculated as the product:

$$p^i = \prod_{m=1}^{M} p^{i,C_m},$$

where $C_m$ denotes curve with index m. In the example of FIG. 1, the curves $C_1$ and $C_2$ could correspond to the curves 116-21 and 116-22, or to curves 116-31, 116-32.

Figure 7:
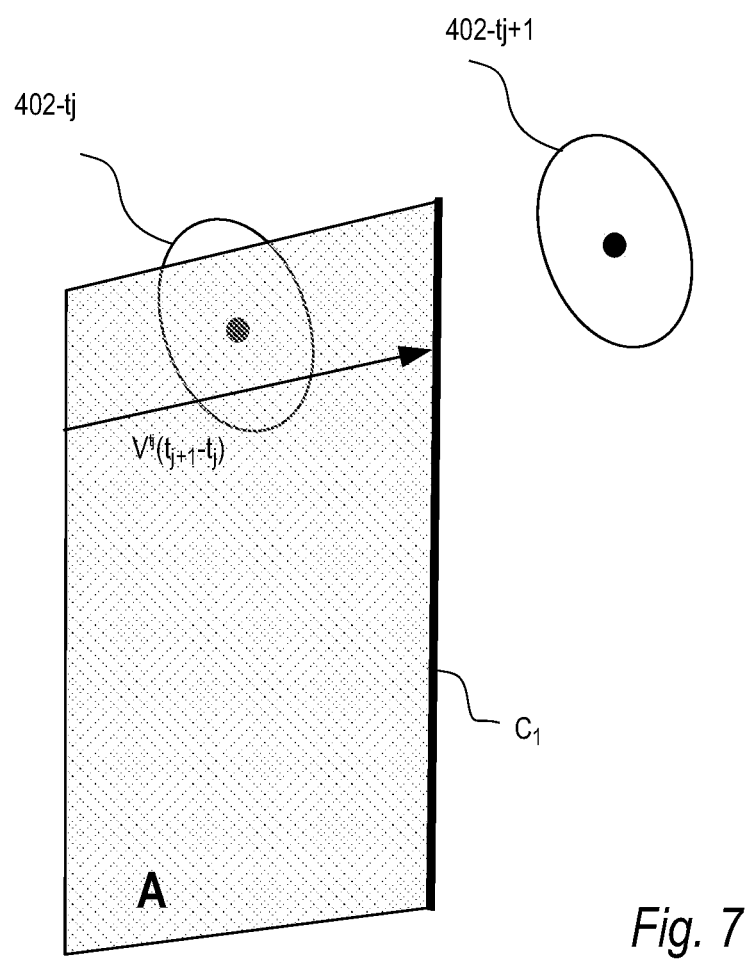
FIG. 7 illustrates a two-dimensional area corresponding to trajectories that will cross a predefined line according to embodiments.

A first example of calculating the probability $p_{t_j}^{i,C_1}$ that the moving object i crossed the predefined curve $C_1$ between time $t_j$ and $t_{j+1}$ will now be explained with reference to FIG. 7. In this example, a simplifying assumption is made that the moving object 106 has a constant velocity $v^{t_j}$ between time points $t_j$ and $t_{j+1}$. It is further assumed that the covariance of the positional states is the same at time points $t_j$ and $t_{j+1}$. The velocity $v^{t_j}$ may be estimated as a difference between the expected position $\mu^{t_{j+1}}$ at time $t_{j+1}$ and the expected position $\mu^{t_j}$ at time $t_j$, divided by $t_{j+1}-t_j$. Due to this assumption, the calculating unit 206 may calculate the probability $p_{t_j}^{i,C_1}$ from the marginal distribution of the position of the object 106, instead of considering the distribution of the full state vector. In case a Kalman filter is used, this marginal distribution is a two-dimensional normal distribution. In more detail, the calculating unit 206 may calculate the probability $p_{t_j}^{i,C_1}$ according to:

$$p_{t_j}^{i,C_1} = \int_A f_{X_j}(x,y)dxdy,$$

where $f_{X_j}(x,y)$ is the likelihood of the position (x,y) of the moving object 106 at time $t_j$, and A is a set in two-dimensional space. The set A is shown in FIG. 7 and includes all spatial points (x,y) which during translation by the vector $v^{t_j} \cdot (t_{j+1} - t_j)$ crosses the curve $C_1$. Accordingly, the probability $p_{t_j}^{i,C_1}$ is calculated by integrating the likelihood of those trajectories that will cross the line $C_1$.

In a second example, no assumption regarding a constant velocity is made. As mentioned above, the first set of equations of the state space model allows for making a prediction $\hat{x}_{j+1}$ of the state vector $X_{j+1}$ at time $t_{j+1}$ from the state vector $X_j$ at time $t_j$. Thus, if a trajectory starts at $x_j$ it may be predicted to end at $\hat{x}_{j+1}$ using the first set of equations. The pair $(x_j, \hat{x}_{j+1})$ forms a possible trajectory. A likelihood for this trajectory may be evaluated using the time dependent probability density function of the state vector. In particular, it may be evaluated using the joint probability density function $f_{X_j,X_{j+1}}$ of the state vectors $X_j$ and $X_{j+1}$. Under an assumption of independent measurement errors, the likelihood $f_{X_j,X_{j+1}}(x_j, \hat{x}_{j+1})$ of the trajectory may be calculated as:

$$f_{X_j,X_{j+1}}(x_j,\hat{x}_{j+1}) = f_{X_j}(x_j) f_{X_{j+1}}(\hat{x}_{j+1}),$$

where $f_{X_j}(x_j)$ and $f_{X_{j+1}}(\hat{x}_{j+1})$ are the likelihoods of the start point $x_j$ and the predicted end point $\hat{x}_{j+1}$ of the trajectory as evaluated using the probability density functions $f_{X_j}(x)$ and $f_{X_{j+1}}(x)$. The calculating unit 206 may calculate the probability $p_{t_j}^{i,C_1}$ by evaluating the following integral:

$$p_{t_j}^{i,C_1} = \int_B f_{X_j,X_{j+1}}(x_j,\hat{x}_{j+1}) dx_j.$$

Here the set B is the set of $x_j$ for which the corresponding trajectories $(x_j, \hat{x}_{j+1})$ cross the line $C_1$. By defining the indicator function $1_{\{(x_j, \hat{x}_{j+1}) \text{ crosses } C_1\}}$ which takes the value 1 if the trajectory $(x_j, \hat{x}_{j+1})$ crosses the curve $C_1$, the integral may be rewritten as:

$$p_{t_j}^{i,C_1} = \iint f_{X_j,X_{j+1}}(x_j,\hat{x}_{j+1}) 1_{\{(x_j,\hat{x}_{j+1}) \text{crosses } C_1\}} dx_j.$$

Figure 5:
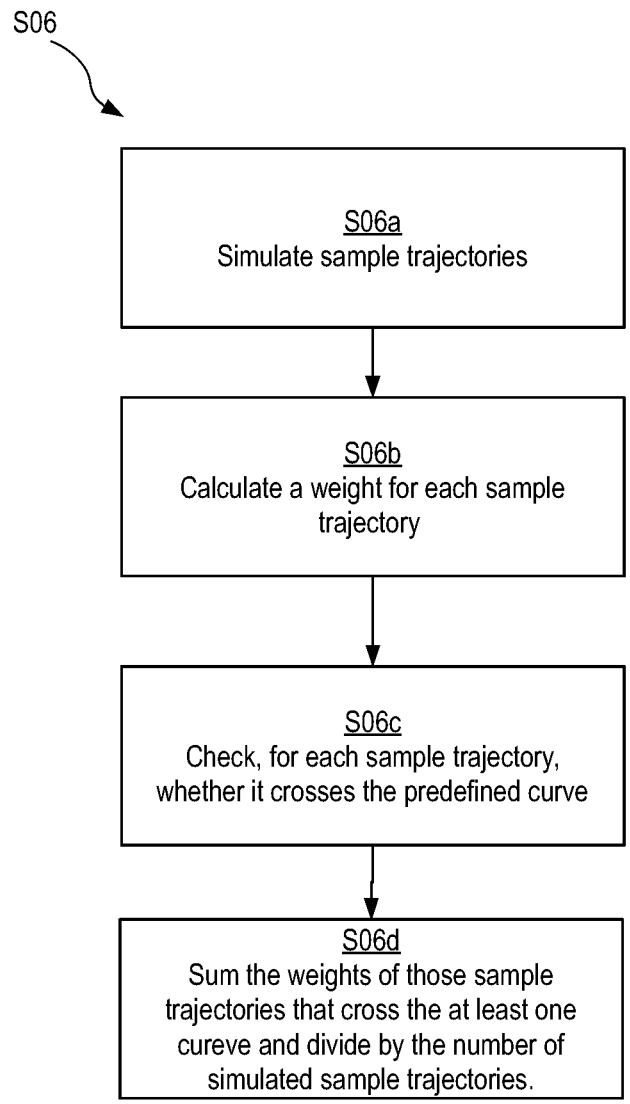
FIG. 5 is a flow chart of a method for calculating a success probability that a moving object succeeded to cross a predefined curve in the scene according to embodiments.

The calculating unit 206 may use a Monte-Carlo integration approach to evaluate the integral. On a general level, that approach simulates a plurality of sample trajectories of the moving object. The sample trajectories may be samples from a sampling distribution. For each sample trajectory, it is checked whether or not it crosses the predefined curve. Further, a weight may be evaluated for each sample trajectory. The weight of a sample trajectory may be equal to a ratio between the likelihood of the sample trajectory according to the joint probability density function and the likelihood of the sample trajectory according to the sampling distribution. The calculation of the success probability then involves summing the weights of those sample trajectories that cross the at least one curve and dividing by the number of simulated sample trajectories. This approach will now be explained in more detail with reference to the flow chart of FIG. 5.

Figure 6:
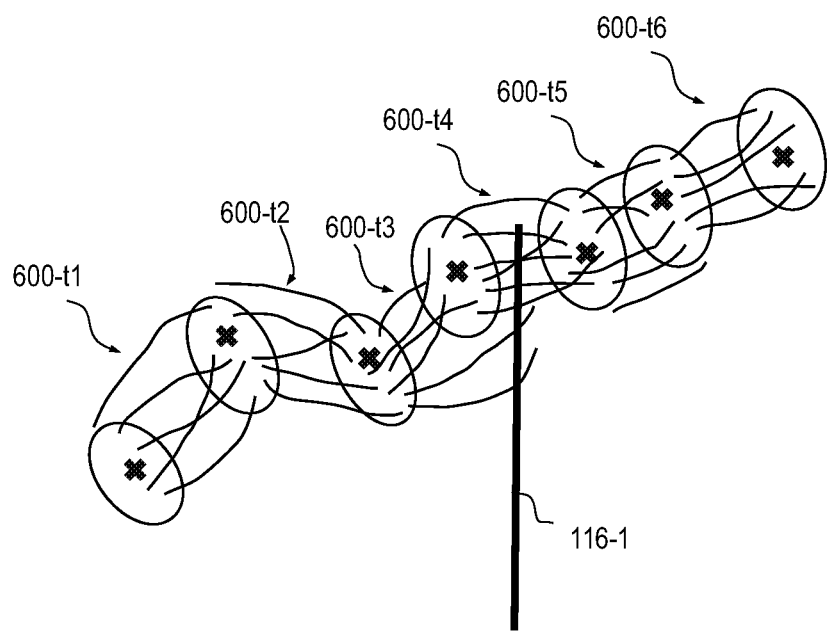
FIG. 6 schematically illustrates sample trajectories which are simulated with respect to the plurality of time points of FIG. 4.

In step S06a, the calculating unit 206 simulates a plurality of sample trajectories. Specifically, the calculating unit 206 may, for each time point, simulate a plurality of sample trajectories. The plurality of time points may correspond to the time points t1-t7 when detections were made. Each sample trajectory extends between a first time point $t_j$ to a next time point $t_{j+1}$. A plurality of sample trajectories 600-t1, 600-t2, 600-t3, 600-t4, 600-t5, 600-t6 simulated with respect to time points t1-t7 are schematically illustrated in FIG. 6. In FIG. 6 only a few samples are shown for each time point t1-t7. In reality, however, a large number of samples in the order of thousands of samples may have to be simulated per time point to reach convergence of the Monte-Carlo integration.

According to one alternative, each sample trajectory is sampled by using the time dependent probability function of the state vector of the moving object. More specifically, each sample trajectory is sampled from the joint probability density function $f_{X_j,X_{j+1}}(x_j, \hat{x}_{j+1})$ defined above. Finding an expression for the joint probability density function is simplified by back-tracking the probability density function $f_{X_{j+1}}(\hat{x}_{j+1})$ from time $t_{j+1}$ to time $t_j$ and observing that $f_{X_j}(x_j) f_{X_{j+1}}(\hat{x}_{j+1}) = f_{X_j}(x_j) f_{X_{j+1}}{}^j(x_j)$, where $f_{X_{j+1}}{}^j(x_j)$ is the back-tracked probability density function. If the time dependent probability density functions of the state vectors are multivariate normal distributions, the joint probability density function will also be a multivariate normal distribution from which sampling is possible.

According to another alternative, the calculating unit 206 instead uses importance sampling to simulate sample trajectories. Importance sampling may be used in situations where sampling from the joint probability density function $f_{X_j,X_{j+1}}(x_j, \hat{x}_{j+1})$ is difficult. When importance sampling is used, the calculating unit 206 samples from another distribution which is easier to sample from and compensates for that later on when calculating weights in the Monte-Carlo integral. In particular, the calculating unit 206 may sample a state vector $x_j$ at time $t_j$ from a probability distribution being associated with a probability density function q(x). The probability density function q(x) may be selected to be equal to $f_{X_j}(x)$. Alternatively, the probability density function q(x) may be selected to be another probability density function. For example, it may be a multivariate Normal distribution with the same mean as the probability distribution of the state vector $X_j$, or chosen by heuristic, but where the covariance matrix is modified such that the variances are larger than for the state vector $X_j$. With importance sampling it is hence possible to produce more samples in the tails of the distribution. In particular, the distribution q(x) may be selected such that more sample trajectories which are likely to cross the curve are produced compared to if the sample trajectories are sampled from the true distribution. For example, more state vectors having positions closer to the curve may be produced.

Once a sample state vector $x_j$ corresponding to time $t_j$ has been produced, the calculating unit 206 may predict a sample state vector $\hat{x}_{j+1}$ corresponding to time $t_{j+1}$ by using the first set of equations of the state space model described above. The pair of sample state vectors $(x_j, \hat{x}_{j+1})$ now define a sample trajectory. In particular, the sample trajectory in between the end points $(x_j, \hat{x}_{j+1})$ may be calculated using the first set of equations of the underlying state space model.

Having produced a plurality of sample trajectories for each time point t1-t7, the calculating unit 206 in step S06b calculates a weight $w(x_j, \hat{x}_{j+1})$ for each sample trajectory. The weight of a sample trajectory is equal to a ratio between the likelihood $f_{X_j,X_{j+1}}(x_j, \hat{x}_{j+1})$ of the sample trajectory according to the joint probability density function and the likelihood of the sample trajectory according to the sampling distribution. Thus, if the sample trajectory was sampled from the joint probability density function itself the weight of the sample trajectory is equal to one. If importance sampling is used the weight $w(x_j, \hat{x}_{j+1})$ for the sample trajectory is instead equal to $f_{X_j,X_{j+1}}(x_j, \hat{x}_{j+1})/q(x_j)$.

In step S06c, the calculating unit 206 checks for each sample trajectory whether it crosses the curve 116-1. As described above, a sample trajectory starts in a state $x_j$. The position of the moving object between time $t_j$ and $t_{j+1}$ may then be calculated using the first set of equations of the underlying state space model. Accordingly, a trajectory followed by the moving object between time $t_j$ and $t_{j+1}$ may be evaluated, and the calculating unit 206 may check whether or not that trajectory crosses the curve 116-1.

In step S06d, the calculating unit 206 may calculate the probability $p_{t_j}^{i,C_1}$ that the moving object 106 crossed the predefined curve 116-1 between time points $t_j$ and $t_{j+1}$ based on the K sample trajectories $(x_j^k, \hat{x}_{j+1}^k)$, k=1 . . . K, simulated for time $t_j$. In particular, it may sum the weights of those of the K sample trajectories that cross the curve 116-1 and divide by the number K of sample trajectories. This may be expressed by the following equation:

$$p_{t_j}^{i,C_1} = \frac{1}{K} \sum_{k=1}^{K} w(x_j^k, \hat{x}_{j+1}^k) 1_{\{(x_j^k, \hat{x}_{j+1}^k) \text{ crosses } C_1\}},$$

where $p_{t_j}^{i,C_1}$ is the probability that moving object i crosses the curve $C_1$ between time points $t_j$ and $t_{j+1}$; $w(x_j^k, \hat{x}_{j+1}^k)$ is the weight calculated for sample trajectory $(x_j^k, \hat{x}_{j+1}^k)$ in step S06b; and $1_{\{(x_j^k, \hat{x}_{j+1}^k) \text{ crosses } C_1\}}$ is an indicator function taking the value 1 if the trajectory $(x_j^k, \hat{x}_{j+1}^k)$ crosses the curve $C_1$ as checked in step S06c and the value 0 otherwise. Notably, when the sample trajectories are sampled from the joint probability density function, the probability $p_{t_j}^{i,C_1}$ is equal to the proportion of sample trajectories that cross the curve $C_1$.

When calculating the success probability, the calculating unit 206 may further take the accuracy of the detector 202 into account. Due to detection errors, it is possible that the detector 202 and tracker 204 completely fail to identify a track of a moving object 106. As a result, the number of objects identified by the detector 202 and tracker 204 may be smaller than the actual number of objects 106 that passed within the field of view of the sensor device 112-1, 112-2, 112-3. Accordingly, also the number of objects that crossed the at least one curve 116-1, 116-21, 116-22, 116-31, 116-32 will be underestimated. The chance that a moving object 106 is successfully detected may be quantified in terms of a probability $p_{detect}$. This probability $p_{detect}$ may be a predetermined value which is estimated during configuration of the sensor device 112-1, 112-2, 112-3. For example, an experiment may be carried out where a known number of objects passes the field of view of the sensor device 112-1, 112-2, 112-3. The probability $p_{detect}$ may then be estimated as a number of object tracks which are detected by the detector 202 and tracker 204 in relation to the number of objects that were known to have passed. The detection probability may vary depending on conditions in the scene 100. For example, the detection probability may be higher when there are better light conditions in the scene 100. Therefore, the detection probability may be estimated under different conditions in the scene, and different predetermined values of $p_{detect}$ may be stored in association with the different scene conditions.

The detection probability $p_{detect}$ may be taken into account by the calculating unit 206 when calculating the success probability $p^i$. In more detail, the success probability of a moving object may be corrected for detection inaccuracies by dividing by the detection probability according to:

$$p^i = \frac{\prod_{m=1}^{M} p^{i,C_m}}{p_{detect}}.$$

In that way, the risk of underestimating the number of objects that cross the at least one curve is reduced. The calculating unit 206 may further select an appropriate value of the detection probability based on the current scene conditions. For instance, the calculating unit 206 may receive input regarding a current condition in the scene and select a predetermined detection probability associated with that scene condition.

Following step S06, the processing unit 206 may proceed to calculate an expected value and a variance of the number of moving objects 106 that crossed the at least one predefined curve 116-1, 116-21, 116-22, 116-31, 116-32.

According to embodiments, the processing unit 206 may calculate, for each counting zone 114-1, 114-2, 114-3, an expected value μ and a variance $\sigma^2$ of the number of moving objects 106 that passed the counting zone 114-1, 114-2, 114-3 regardless of the passage being in an in-bound direction 108 or an outbound direction 110. This corresponds to a flow of moving objects via one entrance 104-1, 104-2, 104-3. In the following, this will be described with reference to the counting zone 114-1 of entrance 104-1. However, it is understood that the same applies to the other counting zones. Assume that N objects were detected by the detector 202 and tracked by the tracker 204. Each object i crosses the at least one curve 116-1 defining the counting zone 116-1 with a probability $p^i$ as calculated in step S06. The number of objects 106 that cross the at least one curve 116-1 may be modelled by a Poisson binomial distribution. Hence, the calculating unit 206 may calculate the expected value and variance as $\mu = \sum_{i=1}^{N} p^i$, and the variance as $\sigma^2 = \sum_{i=1}^{N} p^i(1-p^i)$.

According to further embodiments, the processing unit 206 may, for each counting zone 114-1, 114-2, 114-3, treat the in-bound direction 108 and the out-bound direction 110 separately. In particular, it may calculate a first expected value $\mu_{in}$ and a first variance $\sigma_{in}^2$ corresponding to the number of objects that passed the at least one curve defining the counting zone 114-1, 114-2, 114-3 in the in-bound direction 108, and a second expected value $\mu_{out}$ and a second variance $\sigma_{in}^2$ corresponding to the number of objects that passed the at least one curve defining the counting zone 114-1, 114-2, 114-3 in the out-bound direction 110.

Again, this will be described with reference to the counting zone 114-1 of entrance 104-1. Assume that N objects were detected by the detector 202 and tracked by the tracker 204. The processing unit 206 may identify which of these objects approach the curve 116-1 in the in-bound direction 108 (from the outside to the inside of the area 102) and which approach the curve 116-1 in the out-bound direction 110 (from the inside to the outside of the area 102). This may, for instance, be performed by studying whether the expected position of the moving object 106 according to the time dependent probability density function approaches the curve 116-1 from the outside of the area 102 or from the inside of the area 102. In that way, the processing unit 206 may identify a first subset $S_{in}$ of moving objects that approach the curve 116-1 from the outside in the inbound direction 108, and a second subset $S_{out}$ of moving objects that approach the curve 116-1 from the inside in the outbound direction 110. The number of objects 106 that cross the at least one curve 116-1 from each of the directions 108, 110 may be modelled by a Poisson binomial distribution. Hence, the calculating unit 206 may calculate the first expected value and first variance as $\mu_{in} = \sum_{i \in S_{in}} p^i$ and $\sigma_{in}^2 = \sum_{i \in S_{in}} p^i(1-p^i)$ and the second expected value and second variance as $\mu_{out} = \sum_{i \in S_{out}} p^i$ and $\sigma_{out}^2 = \sum_{i \in S_{out}} p^i(1-p^i)$. The above assumes that there is no uncertainty in the identification of the direction of the tracks. However, it would also be possible to estimate a probability that the identified direction is correct and take that probability into account when calculating the first and second expected values and variances.

According to still further embodiments, the processing unit 206 may calculate the expected value and variance of a net flow of moving objects 106 into the area 102 via each entrance 104-1, 104-2, 104-3. The net flow of moving objects 106 into the area 102 via an entrance 104-1, 104-2, 104-3 is the number of moving objects 106 that enters the area 102 via the entrance 104-1, 104-2, 104-3 minus the number of moving objects 106 that leaves the area 102 via the same entrance 104-1, 104-2, 104-3. Accordingly, the expected value $\mu_{net}$ and the variance $\sigma_{net}^2$ of the net flow of moving objects 106 via an entrance 104-1, 104-2, 104-3 may be calculated as a difference $\mu_{net}=\mu_{in}-\mu_{out}$ between the first and second expected value and a sum $\sigma_{net}^2=\sigma_{in}^2+\sigma_{out}^2$ of the first and the second variance, respectively. If this is repeated for each entrance 104-1, 104-2, 104-3, the calculation unit 206 may further calculate an expected net flow of moving object 106 into the area 102 by summing the expected net flows for each entrance 104-1, 104-2, 104-3. The associated variance is obtained by summing the variances of the net flows of each entrance 104-1, 104-2, 104-3.

The calculating unit 206 may use the expected values and variances of the number of moving objects 106 in various ways. In some examples, the calculating unit 206 transmits them to a display such that they are shown to a user. In that way a user is not only provided with an estimate of the number of moving objects that has entered or leaved the area 102 via one or more of the entrances 104-1, 104-2, 104-3, but also an associated uncertainty of the estimate.

The calculating unit 206 may also use the calculated expected values and variances of the number of moving objects 106 to generate alerts. For example, a high variance $\sigma^2$, $\sigma_{in}^2$, $\sigma_{out}^2$ or $\sigma_{net}^2$ of the number of passages via an entrance 104-1, 104-2, 104-3 may be indicative of a poor installation of the corresponding sensor device 112-1, 112-2, 112-3. Therefore, the calculating device 206 may issue an alert if the variance exceeds a threshold, or if the variance (or standard deviation) in relation to the expected value exceeds a threshold. It is also possible to only issue such alert if the expected value exceeds another threshold. The calculating unit 206 may keep analysing the variance over time to issue the alert as soon as the threshold is exceeded. In other examples, the calculating unit 206 only analyses the variance during an installation time period of the sensor device 112-1, 112-2, 112-3.

The calculating unit 206 may further issue alerts if certain events have happened with a probability which is higher than a certain significance level, such as a significance level of 95% or 99%. For example, the calculating unit 206 calculate a probability that the net flow of moving objects into the area 102 via a certain entrance or via any entrance exceeds a threshold. An alert may be generated if the probability is higher than a certain significance level. Alternatively, or additionally, the calculated probability may be displayed to a user to provide him with a measure of how certain it is that the net flow exceeds the threshold. The calculating unit 206 may calculate the probability by using the fact that each of the number of objects that enters and leaves the area 102 is described by a Poisson binomial distribution as described above. The probability distribution of the net flow is hence the distribution of a random variable which is a difference between two Poisson binomial random variables. If the cumulative distribution function of the difference is denoted by F(x), the probability P that the net flow is larger than a threshold T may be calculated as P=1−F(T).

It will be appreciated that a person skilled in the art can modify the above-described embodiments in many ways and still use the advantages as shown in the embodiments above. For example, in the above embodiments integrals with respect to trajectories extending between pairs of subsequent time points were evaluated, and the results were aggregated into a success probability. However, embodiments where integrals with respect to trajectories of longer temporal duration, such as the duration of the whole track, may also be envisaged. It would also be possible to use other state vectors and state space models than those exemplified above, such as state vectors and state space models defined with respect to non-Euclidean coordinate systems. For instance, in case the sensor device is a radar, a polar coordinate system may be used. Thus, the claims should not be limited to the shown embodiments but should only be defined by the appended claims. Additionally, as the skilled person understands, the shown embodiments may be combined.

The invention claimed is:

1. A method for counting a number of moving objects that cross at least one predefined curve in a scene, the method comprising:
   making detections of positions of one or more moving objects in the scene by using data collected by a sensor device,
   tracking the one or more moving objects in the scene over time based on the detections to produce one or more corresponding tracks,
   calculating, for each moving object, a success probability $p^i$ that the moving object succeeded to cross the at least one predefined curve in the scene, and a failure probability $1-p^i$ that the moving object failed to cross the at least one predefined curve in the scene,
   calculating an expected value of a number of moving objects that crossed the at least one predefined curve, and
   calculating a variance of the number of moving objects that crossed the at least one predefined curve,
   wherein each track is described by a time dependent probability density function,
   wherein the success probability of a moving object is calculated by using the time dependent probability density function describing the track of the moving object, and
   wherein the expected value is calculated by summing success probabilities $p^i$ calculated with respect to the one or more moving objects, and the variance is calculated by summing products $p^i(1-p^i)$ of success and failure probabilities calculated with respect to the one or more moving objects.

2. The method of claim 1, wherein the at least one predefined curve in the scene includes a first and a second predefined curve and the calculation of the success probability includes:
   calculating a first and a second success probability that the moving object succeeded to cross the first and the second predefined curve in the scene, respectively, and
   calculating a product of the first and the second success probability.

3. The method of claim 1, wherein the time dependent probability density function describing a track of a moving object defines a likelihood for each possible trajectory of the moving object, and wherein calculating a success probability that a moving object succeeded to cross a predefined curve in the scene includes integrating the likelihood over all trajectories that cross the predefined curve.

4. The method of claim 3, wherein integrating the likelihood includes:
   simulating a plurality of sample trajectories of the moving object,
   calculating a weight for each sample trajectory,
   checking for each sample trajectory whether it crosses the predefined curve in the scene, and
   summing the weights for those sample trajectories that cross the predefined curve and dividing by a number of sample trajectories.

5. The method of claim 1, further comprising:
   dividing the success probability by a predetermined weighting factor,
   wherein the predetermined weighting factor corresponds to a probability that a track of a moving object is successfully detected.

6. The method of claim 5, wherein the predetermined weighting factor is selected depending on conditions in the scene.

7. The method of claim 1, further comprising: generating an alert if the variance of the number of moving objects that crossed the at least one predefined curve exceeds a predefined threshold.

8. The method of claim 1, wherein the step of calculating an expected value and a variance includes calculating a first expected value and a first variance of a number of moving objects that crossed the at least one predefined curve in a first direction from a first to a second side of the at least one predefined curve, and a second expected value and a second variance of a number moving objects that crossed the at least one predefined curve in a second direction from the second to the first side of the at least one predefined curve.

9. The method of claim 8, wherein the first expected value and the first variance are calculated by summing success probabilities $p^i$ and products $p^i(1-p^i)$ of success and failure probabilities calculated with respect to moving objects that approach the at least one predefined curve in the first direction, and
   the second expected value and the second variance are calculated by summing success probabilities $p^i$ and products $p^i(1-p^i)$ of success and failure probabilities calculated with respect to moving objects that approach the at least one predefined curve in the second direction.

10. The method of claim 8, wherein the at least one predefined curve in the scene defines boundaries of a counting zone arranged at a an entrance of an area in the scene, and the first direction corresponds to a direction into the area and the second direction to a direction out from the area, the method further comprising:
    calculating an expected value and a variance of a net flow of moving objects into the area via the entrance as a difference between the first and second expected value and a sum of the first and the second variance, respectively.

11. The method of claim 10, further comprising:
    calculating a probability that the net flow of moving objects into the area via the entrance is larger than a threshold, and
    generating an alert if the calculated probability is larger than a predefined significance level.

12. The method according to claim 8, wherein the area in the scene comprises a plurality of entrances, each being associated with a counting zone defined by at least one predefined curve, and wherein the method is repeated for each entrance to calculate an expected value and a variance of a net flow of moving objects into the area via each entrance.

13. The method of claim 12, further comprising:
    calculating a probability that the net flow of moving objects into the area via any of the plurality of entrances is larger than a threshold, and
    generating an alert if the calculated probability is larger than a predefined significance level.

14. A device for counting a number of moving objects that cross at least one predefined curve in a scene, comprising:
    a detector configured to make detections of positions of one or more moving objects in the scene using data collected by a sensor device,
    a tracker configured to track the one or more moving objects in the scene over time based on the detections made by the detector to produce one or more corresponding tracks,
    a calculating unit configured to, for each moving object, calculate a success probability $p^i$ that the moving object succeeded to cross the at least one predefined curve in the scene, and a failure probability $1-p^i$ that the moving object failed to cross the at least one predefined curve in the scene, the calculating unit being configured to calculate an expected value of a number of moving objects that crossed the at least one predefined curve,
    wherein the tracker is configured to describe each track by a time dependent probability density function,
    wherein the calculating unit is configured to calculate the success probability of a moving object by using the time dependent probability density function describing the track of the moving object, and to calculate a a variance of a number of moving objects that crossed the at least one predefined curve,
    wherein the expected value is calculated by summing success probabilities $p^i$ calculated with respect to the one or more moving objects, and the variance is calculated by summing products $p^i(1-p^i)$ of success and failure probabilities calculated with respect to the one or more moving objects.

15. A non-transitory computer-readable medium comprising computer-code instructions adapted to carry out a method when executed by a device having processing capability, the method for counting a number of moving objects that cross at least one predefined curve in a scene, comprising:
    making detections of positions of one or more moving objects in the scene by using data collected by a sensor device,
    tracking the one or more moving objects in the scene over time based on the detections to produce one or more corresponding tracks,
    calculating, for each moving object, a success probability $p^i$ that the moving object succeeded to cross the at least one predefined curve in the scene, and a failure probability $1-p^i$ that the moving object failed to cross the at least one predefined curve in the scene,
    calculating an expected value of a number of moving objects that crossed the at least one predefined curve, and
    calculating a variance of the number of moving objects that crossed the at least one predefined curve,
    wherein each track is described by a time dependent probability density function, wherein the success probability of a moving object is calculated by using the time dependent probability density function describing the track of the moving object, and wherein the expected value is calculated by summing success probabilities $p^i$ calculated with respect to the one or more moving objects, and the variance is calculated by summing products $p^i(1-p^i)$ of success and failure probabilities calculated with respect to the one or more moving objects.

* * * * *